Patented Apr. 15, 1947

2,418,938

UNITED STATES PATENT OFFICE 2,418,938

SULFUR-CONTAINING POLYMERIC COMPOUNDS

Emmette F. Izard, Kenmore, N. Y., assignor to E. I. du Pont de Nemours & Company, Wilmington, Del., a corporation of Delaware No Drawing. Application January 19, 1944, Serial No. 518,877

7 Claims. (Cl. 260—79)

This invention relates to polymeric materials, and more particularly to polymeric materials having sulfur-containing functional groups, and to methods of preparing the same. The invention also relates to polymeric materials cross-linked by means of sulfur-containing links, and to methods of producing the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers, including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

It is an object of this invention to provide a new and useful polymeric material containing sulfur. Another object of this invention is to provide a polymeric material having sulfur-containing functional groups. A still further object is to provide a process of preparing the aforementioned polymeric materials, which process is easy of accomplishment and readily controlled. Other objects of the invention will appear hereinafter.

The objects of this invention are accomplished by reacting a thiosulfate taken from the class consisting of alkali metal, ammonia and amine thiosulfates with a reactive group of a polymeric material to form on said polymeric material a thiosulfate functional group and reacting two of the said thiosulfate functional groups of the polymeric material to form a cross-linked polymeric material. The latter reaction will take place in the presence of heat or a mild oxidizing agent. The cross-linked polymeric material exhibits a materially lower solubility in water or common organic solvents than the original polymer or its thiosulfate derivative.

A further object of this invention is accomplished by reacting the cross-linked polymeric material with thioglycolic acid to produce a mercaptan.

The present invention will be more clearly understood by reference to the following detailed examples, it being understood, however, that these examples are illustrative and that the scope of the invention is not to be limited thereto. Throughout the examples, the parts of substances referred to are parts by weight unless otherwise indicated.

Example I

A solution of 160 parts of polyvinyl chloracetate (prepared by the polymerization of vinyl chloracetate in the presence of peroxide) in 640 parts of methyl Cellosolve (mono methyl ether of ethylene glycol) was treated at a temperature of 80° C., with a solution of 310 parts of hydrated sodium thiosulfate in 310 parts of water. The sodium thiosulfate reacted with the polyvinyl chloracetate and the mixture became homogeneous within 5 minutes, after which it was immediately cooled to room temperature. It gave a negative test for sodium thiosulfate. The product was soluble in water and in methyl Cellosolve. It was coagulated by a 50–50 mixture of alcohol and acetone, and analysis indicated that approximately 92% of the chlorine atoms of the chloroacetate groups had been replaced by sodium thiosulfate groups.

A methyl Cellosolve solution of the above-mentioned product was cast onto a heated plate to form a thin, transparent film. The dried film, which was still water-soluble, was then treated for 1 minute with a solution composed of 98 parts of alcohol and 2 parts of iodine, whereupon it became insoluble in and insensitive to water and common organic solvents, including methyl Cellosolve. Sulfur analysis agreed with the theoretical value for a compound of the structure,

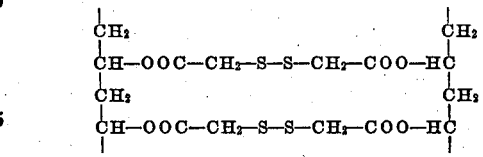

the residual valences of the end C atoms of the structure indicating them to be present in polymeric chains of the polymeric material.

Treatment of this insoluble film with a solution containing 1.525 parts of thioglycolic acid per part of polyvinyl chloracetate originally used in the production of the insoluble film and made by dissolving 50 parts of thioglycolic acid in 50 parts of a mixture of 80% acetone and 20% water caused the film to again become water-soluble. The amount (1.525 parts) of thioglycolic acid per part of polyvinyl chloracetate originally used to produce the insoluble film was required for complete reaction. Preferably, the thioglycolic acid was used in excess of the required amount. A quantity of the water-soluble film dissolved in water, when tested with alkaline sodium nitroprusside solution, turned violet-red in color, thereby indicating the presence of free thiol groups. This evidence lends further support to the fact that the insoluble product contained the grouping —S—S—. The treatment of the insoluble film with thioglycolic acid produced polyvinyl thioglycolate.

Example II

A p-toluene sulfonate derivative of cellulose acetate was prepared in the following manner. 400 parts of dry cellulose acetate containing 1.66 acetyl groups per glucose unit were dissolved in 1475 parts of pyridine and treated with 400 parts of p-toluene sulfonyl chloride dissolved in 295 parts of pyridine, the mixture being cooled with water until the initial evolution of heat had subsided, after which it was allowed to stand for 4 hours at room temperature and was finally coagulated in water.

450 parts of the resulting p-toluene sulfonate derivative of cellulose acetate (containing 1.66 acetyl groups and 0.29 p-toluene sulfonate groups per glucose unit) were then dissolved in a mixture of 792 parts of acetone, 966 parts of methyl Cellosolve and 100 parts of water. The solution was heated to 63° C., and a mixture of 250 parts of sodium thiosulfate pentahydrate, 97 parts of methyl Cellosolve, and 125 parts of water were added. At the end of 2½ hours, the mixture was cooled to room temperature and water was slowly added until the polymeric material coagulated. The coagulated material thus obtained was washed and dried at 65° C. 440 parts of a product containing 4.28% of sulfur (corresponding to 0.075 thiosulfate groups and 0.215 p-toluene sulfonate groups per glucose unit) were obtained. The material resembled cellulose acetate in its solubility characteristics and, like cellulose acetate, the material was soluble in a mixture of 50 parts of acetone, 10 parts of water, and 40 parts of methyl Cellosolve. A solution of the material in such a mixture was suitable for the casting of films or for the spinning of yarns by the dry spinning process. Typical yarns obtained in this manner possessed a tenacity of 1 gram per denier and an elongation of 30%.

Samples of cast film, when heated in air at 100° C., for a period of 30 minutes, were rendered substantially completely insensitive to water and insoluble in common organic solvents or mixtures thereof, including, for example, the above-described solvent comprising a mixture of acetone, water and methyl Cellosolve. Analysis of these insolubilized films after washing and drying indicated that they had within their structures units corresponding to the formula:

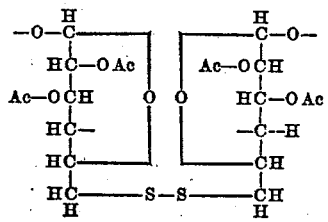

wherein the symbols "Ac" represent acetyl groups and the glucose units are portions of the same or adjacent polymeric molecules. When subsequently treated with an acetone solution of thioglycolic acid in the manner of Example I above, the films became soluble in organic solvents and showed a positive test for the presence of thiol groups.

Example III

A sample of polyvinyl chloracetal was made by reacting 88 parts of polyvinyl alcohol, 200 parts of denatured alcohol, 100 parts of monochloracetal and .6 part of sulfuric acid at reflux temperature for 7 hours. The product was removed from the reaction mixture by filtration and found to be insoluble in water, but readily soluble in a mixture of alcohol and water. The dry product contained about ¼ mol acetal substitution per polyvinyl unit.

100 parts of the polyvinyl chloracetal were dissolved in a mixture of 250 parts of methoxy ethanol and 350 parts of water. 50 parts of hydrated sodium thiosulfate in 150 parts of water were added to the solution and the mixture heated on a hot water bath with stirring for 3 hours, at which time a homogeneous smooth solution had been obtained. To complete the reaction, the solution was heated for an additional 10 hours at 90° C. A film of this solution was cast on glass, dried at 65° C. and washed with water. The film was then treated with hydrogen peroxide, whereupon it became insoluble in and insensitive to water and common organic solvents. Analysis of this insolubilized film, after washing and drying, indicated the absence of chlorine and the presence of a substantial amount of sulfur, and its properties indicated it to be cross-linked.

The above detailed examples illustrate embodiments of the present invention wherein a thiosulfate is reacted with three specific polymeric materials containing specific reactive groups, namely, a polyvinyl compound containing a chloracetate reactive group (Example I), cellulose acetate containing a p-toluene sulfonate reactive group (Example II), and a polyvinyl compound containing a chloracetal reactive group (Example III). The present invention is not, however, to be so limited. In its broad scope, the present invention relates to the treatment with a thiosulfate, of any polymeric material containing any reactive group which will react with the thiosulfate to form on said polymeric material a thiosulfate-containing functional group.

As examples of other polymeric materials which may contain functional groups which are reactive with a thiosulfate to produce a polymeric material having thiosulfate-containing functional groups, the following may be named: vinyl polymers, polyacrylic compounds, polymeric resins, cellulose derivatives, linear condensation polymers, for example, synthetic resins, synthetic linear condensation polyamides, polyesters, polyethers and polyanhydrides, and the like, provided only that the polymeric material contains, or can be made to contain, a reactive or functional group which is reactive with the thiosulfate to produce a polymeric material having a thiosulfate-containing functional group.

As examples of reactive groups, which may be contained in the polymeric material to react with the thiosulphate in accordance with the invention, the following may be named: any functional ester group taken from the class consisting of halogen esters, sulfate esters and sulfonate esters, for example, mono-, di- or trichloracetates, chlor-ketals, chloracetals, sulfates, alkyl or aryl sulfates and alkyl, aralkyl or aryl sulfonates.

With regard to the treatment of the reactive-group-containing polymeric materials with the thiosulfate of this invention, it is preferred to conduct the reaction in the presence of an inert solvent that is miscible with both the polymeric material and the thiosulfate. However, this is not essential and the reaction can, if desired, be conducted in the presence of an inert solvent with which only one of the reactants is miscible. The use of such a solvent, of course, generally requires somewhat longer, more rigorous treating conditions. Under the preferred conditions, as indicated above, it is usually sufficient to heat the polymeric material with the thiosulfate on a water bath for periods of from 1 to 24 hours. The extent of the reaction varies directly with the rigorousness of the reaction conditions.

Because of their ready availability and relative stability, it is preferred to employ an alkali metal thiosulfate in the practice of this invention, and of these sodium thiosulfate is preferred. However, this is not essential, and other alkaline thiosulfates, including ammonium thiosulfate, magnesium thiosulfate, and amine thiosulfates, can be employed if desired.

As above stated, this invention also contemplates the cross-linking of the polymeric materials having the thiosulfate-containing functional groups as obtained by the reaction with the thiosulfate. Such cross-linking of the polymeric materials is of particular value where it is desired to make the original polymeric material or their sulfur-containing derivatives less soluble in water or common organic solvents. As shown in the examples, this cross-linking and insolubilizing of the polymeric thiosulfate derivatives of this invention are brought about by subjecting the thiosulfate derivatives to oxidizing conditions, i. e., heating these derivatives alone or in the presence of air or by treating them with mild oxidizing agents, such as iodine, peroxides, ferricyanides, dilute nitric acid, and the like. Such heating or mild oxidation destroys the thiosulfate portion of the thiosulfate-containing functional groups of the polymeric material, and causes the residual portions of adjacent pairs of such groups to combine to form an —S—S— (disulfide) link. These pairs may be members of the same or adjacent molecules of the polymeric material.

The degree of insolubility of the final cross-linked polymeric material obtained varies directly, of course, with the number of thiosulfate groups inserted by the reaction of this invention in the polymeric material and destroyed by the heating or oxidation treatment, and is also somewhat affected by the solubility characteristics of the original unreacted polymeric material. For example, in the case of the polyvinyl chloracetate employed in Example I, the thiosulfate derivative obtained when only 15% of the available chlorine atoms have been replaced by thiosulfate can be rendered water-insoluble by oxidation with alcoholic iodine, although it will still be somewhat swollen by water and the common organic solvents. This degree of water-sensitivity and organic solvent-sensitivity is rapidly reduced, however, as the degree of substitution is increased, and it has been found possible by means of this invention to replace up to and including 100% of the chlorine atoms with thiosulfate groups, thus making possible the production of a compound that possesses the maximum number of —S—S— groups, which compound is marked by its complete insolubility in and insensitivity toward water and common organic solvents.

As shown in the examples, the process of this invention makes possible the preparation of water-insoluble and organic solvent-insoluble shaped articles of polymeric materials. A shaped article is preferably prepared from the soluble thiosulfate derivative of the polymer obtained in accordance with the present invention. However, this is not essential and the entire treatment, including modification of the polymer to insert a reactive group and subsequent treatment with sodium thiosulfate and then with an oxidizing agent, can, if desired, be conducted on a pre-formed polymeric article. Thus, for example, a formed structure, such as a sheet of regenerated cellulose, can be surface-esterified with p-toluene sulfonyl chloride, the resulting ester then being treated in sheet form with sodium thiosulfate and subsequently oxidized to form a water-insoluble and organic solvent-insoluble sheet.

This invention provides a simple and easily controlled process for the introduction of sulfur into a polymeric material, the sulfur being present as a thiosulfate functional group. When such a thiosulfate-containing polymeric material is subsequently heated or treated with a mild oxidizing agent, a sulfur cross-linkage is created between adjacent chains of the polymer. The presence of such linkages renders a polymeric material less soluble in and less sensitive to water and common organic solvents, and the invention thus provides a simple, easily controlled process for the insolubilization of a polymeric material. In certain instances (when the thiosulfate derivative of the polymeric material is insolubilized by being subjected to oxidizing conditions such as heat or treatment with a mild oxidizing agent), the insoluble product obtained can be restored to a soluble state, and again rendered insoluble by heating or by treatment with an oxidizing agent. The process of the invention lends itself to the treatment of pre-formed articles of a polymeric material. The process does not give rise to the formation of undesirable by-products, the polymeric material finally obtained being substantially free of such compounds and possessing a light color. Because of the presence of the sulfur in the final product, yarns produced in accordance with the invention resemble wool in many of their characteristics.

Since it is obvious that many changes and modifications can be made in the above-described details without departing from the nature and spirit of the invention, it is to be understood that the invention is not to be limited to the details described herein except as set forth in the appended claims.

I claim:

1. A saturated macromolecular organic compound having at least one recurring unit linked together in chain-like fashion in the molecule thereof, an average molecular weight in excess of 1000 and containing sulfur and wherein the first valence of a bivalent sulfur atom is attached through a methylene group to a member of the group consisting of (a) a carbon atom which, in turn, is attached to an oxygen atom directly attached to the chain of the macromolecular compound, (b) a carbon atom which, in turn, is attached to both an oxygen atom directly attached to the chain of the macromolecular compound and to a second oxygen atom by only one bond, and (c) a carbon atom which, in turn, is attached to both an oxygen atom directly attached to the chain of the macromolecular compound and to a second oxygen atom by two bonds, the second valence of the sulfur atom being satisfied by a member of the group consisting of hydrogen and another bivalent sulfur atom whose second valence is satisfied in the same manner as the first valence of the first-named sulfur atom.

2. A saturated macromolecular organic compound having at least one recurring unit linked together in chain-like fashion in the molecule thereof, an average molecular weight in excess of 1000 and containing sulfur and wherein the first valence of a bivalent sulfur atom is attached through a methylene group to a carbon atom which is in turn attached to both an oxygen atom attached directly to the polymer chain, the second valence of the sulfur atom being satisfied by a member of the group consisting of hydrogen and another bivalent sulfur atom whose second valence is satisfied in the same manner as the first valence of the first-named sulfur atom.

3. A saturated macromolecular organic compound having at least one recurring unit linked together in chain-like fashion in the molecule thereof, an average molecular weight in excess of 1000 and containing sulfur and wherein the first valence of a bivalent sulfur atom is attached through a methylene group to a carbon atom which is in turn attached to both an oxygen atom attached directly to the polymer chain and to another oxygen atom by at least one bond, the second valence of the sulfur atom being satisfied by a member of the group consisting of hydrogen and another bivalent sulfur atom whose second valence is satisfied in the same manner as the first valence of the first-named sulfur atom.

4. A saturated macromolecular organic compound having at least one recurring unit linked together in chain-like fashion in the molecule thereof, an average molecular weight in excess of 1000 and containing sulfur and wherein the first valence of a bivalent sulfur atom is attached through a methylene group to a carbon atom which is in turn attached through an oxygen atom directly to the polymer chain and to another oxygen atom by two bonds, the second valence of the sulfur atom being satisfied by a member of the group consisting of hydrogen and another bivalent sulfur atom whose second valence is satisfied in the same manner as the first valence of the first-named sulfur atom.

5. A cross-linked saturated macromolecular organic compound having an average molecular weight in excess of 1000 and containing within its structure units corresponding to the formula

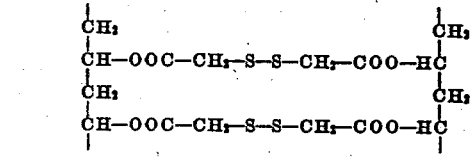

6. Polyvinyl thioglycolate.

7. A cross-linked saturated macromolecular organic compound having an average molecular weight in excess of 1000 and containing within its structure units corresponding to the formula

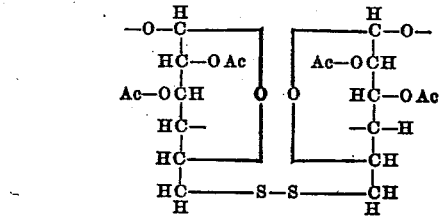

wherein the symbols "Ac" represent acetyl groups, and the glucose units are portions of polymeric molecules.

EMMETTE F. IZARD.

REFERENCES CITED

The following references are of record in the file of this patent:

UNITED STATES PATENTS

| Number | Name | Date |
|---|---|---|
| 1,843,058 | Wrede | Jan. 26, 1932 |
| 2,216,044 | Patrick | Sept. 29, 1940 |
| 2,221,418 | Weihe | Nov. 12, 1940 |
| 1,672,157 | Herrmann | June 5, 1928 |